United States Patent
Park et al.

(10) Patent No.: US 9,491,349 B2
(45) Date of Patent: Nov. 8, 2016

(54) METHOD AND APPARATUS FOR PERFORMING AUTO FOCUS WITH MULTIPLE IMAGES HAVING DIFFERENT EXPOSURE TIMES

(71) Applicant: HANWHA TECHWIN CO., LTD., Changwon-si (KR)

(72) Inventors: Hyunwoo Park, Changwon-si (KR); Jungwon Pac, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/582,518

(22) Filed: Dec. 24, 2014

(65) Prior Publication Data

US 2015/0181107 A1    Jun. 25, 2015

(30) Foreign Application Priority Data

Dec. 24, 2013    (KR) .................. 10-2013-0162612

(51) Int. Cl.
*H04N 5/232*    (2006.01)
*H04N 5/235*    (2006.01)

(52) U.S. Cl.
CPC ........ *H04N 5/23212* (2013.01); *H04N 5/2353* (2013.01)

(58) Field of Classification Search
CPC .................. H04N 5/23212; H04N 5/2353
USPC ....................................... 348/349
See application file for complete search history.

(56) References Cited

U.S. PATENT DOCUMENTS

| | | | |
|---|---|---|---|
| 8,687,106 B2 | 4/2014 | Takeuchi | |
| 2008/0253758 A1* | 10/2008 | Yap | H04N 5/2351 396/234 |
| 2010/0165177 A1* | 7/2010 | Liaw | H04N 5/23212 348/349 |
| 2011/0128432 A1* | 6/2011 | Shiohara | H04N 5/23212 348/333.02 |
| 2013/0136364 A1* | 5/2013 | Kobayashi | G06T 5/009 382/195 |
| 2013/0265464 A1* | 10/2013 | Nishio | H04N 5/23212 348/239 |

FOREIGN PATENT DOCUMENTS

| | | |
|---|---|---|
| JP | 2002-196220 A | 7/2002 |
| JP | 2012-137511 A | 7/2012 |
| KR | 10-2011-0035512 A | 4/2011 |
| KR | 10-2012-0134966 A | 12/2012 |

* cited by examiner

*Primary Examiner* — Gevell Selby
(74) *Attorney, Agent, or Firm* — Sughrue Mion, PLLC (57) ABSTRACT

Provided are an autofocus (AF) adjusting method and apparatus. The AF adjusting method for an AF adjusting apparatus includes: generating a first image signal by photographing an area (or object) during a first exposure time; generating a second image signal by photographing the area during a second exposure time shorter than the first exposure time; generating a composite image signal by combining the first and second image signals; and calculating a focus detection evaluation value from the composite image signal.

18 Claims, 8 Drawing Sheets

METHOD AND APPARATUS FOR PERFORMING AUTO FOCUS WITH MULTIPLE IMAGES HAVING DIFFERENT EXPOSURE TIMES

CROSS-REFERENCE TO THE RELATED APPLICATION

This application claims priority from Korean Patent Application No. 10-2013-0162612, filed on Dec. 24, 2013, in the Korean Intellectual Property Office, the disclosure of which is incorporated herein in its entirety by reference.

BACKGROUND

1. Field

Methods and apparatuses consistent with exemplary embodiments relate to an autofocus (AF) adjusting method and apparatus.

2. Description of the Related Art

When using a digital photographing device such as a camera or a camcorder, it is necessary to accurately focus on an object for capturing clear still images or a video of the object. Examples of autofocus (AF) methods for automatically adjusting the focus include a contrast AF method and a phase difference AF method.

In the contrast AF method, photographing is performed while varying a position of a focusing lens, and along with this, contrast values are obtained from an image signal detected by an imaging sensor to move the focusing lens to a position where the contrast values have a peak. However, the contrast AF method may have a focus point error if a contrast peak is present in a brightness saturation area caused by, for example, a light source.

SUMMARY

One or more exemplary embodiments provide an autofocus (AF) adjusting method and apparatus.

Various aspects of the exemplary embodiments will be set forth in part in the description which follows and, in part, will be apparent from the description, or may be learned by practice of the presented exemplary embodiments.

According to one or more exemplary embodiments, there is provided an autofocus (AF) adjusting method for an AF adjusting apparatus which may include: generating a first image signal by photographing an area (or object) during a first exposure time; generating a second image signal by photographing the area during a second exposure time; generating a composite image signal by combining the first and second image signals; and calculating a focus detection evaluation value from the composite image signal, wherein the second exposure time is shorter than the first exposure time.

The second exposure time may be a maximum possible time during which pixel brightness of the second image signal remains unsaturated.

The second exposure time may be set to a range of ½ to ¹⁄₁₀ of the first exposure time The AF adjusting method may further include: detecting a brightness saturation area included in the photographed area from the first image signal; if the brightness saturation area is not detected from the first image signal, calculating a focus detection evaluation value from the first image signal without generating the second image signal; and if the brightness saturation area is detected from the first image signal, the second image signal is generated.

The detecting the brightness saturation area included in the photographing area from the first image signal may include: counting a number of pixels included in a reference brightness range; and determining whether a ratio of the counted number of pixels to a total number of pixels is within a reference ratio range, wherein if the ratio is not within the reference ratio range, the focus detection evaluation value is calculated from the first image signal, and if the ratio is within the reference ratio range, the second image signal is generated.

The reference brightness range may include one or more of a minimum brightness vale and a maximum brightness vale, and the reference ratio range may include one or more of a minimum ratio value and a maximum ratio value.

The AF adjusting apparatus may include a movable focusing lens, and one or more of the first image signal, the second image signal, and the composite image signal may be generated at each position where the focusing lens is moved.

The generating the composite image signal may be performed by replacing a brightness saturation area of the first image signal with a corresponding area of the second image signal.

The first image signal and the second image signal may be combined by using the following formula:

$$P3(x,y) = P1(x,y) \times w1 + P2(x,y) \times (1-w1),$$

where $P1(x, y)$ refers to a pixel brightness value at a coordinate $(x, y)$ of the first image signal, $P2(x, y)$ refers to a pixel brightness value at a coordinate $(x, y)$ of the second image signal, and $P3(x, y)$ refers to a pixel brightness value at a coordinate $(x, y)$ of the composite image signal.

The brightness weight value $w1$ may from 0 to 1 and may be determined by the following formula:

$$1 - a \times (P1(x,y)/Y\max),$$

where $a$ refers to a positive number, and $Y\max$ refers to a maximum brightness value.

According to one or more exemplary embodiments, there is provided an AF adjusting apparatus which may include: an imaging lens comprising a movable focusing lens for focus control; an image composer configured to combine a first image signal obtained by photographing an area during a first exposure time and a second image signal obtained by photographing the area during a second exposure time shorter than the first exposure time; and a focus determiner configured to calculate a focus detection evaluation value based on a composite image signal generated by the image composer and determine a position of the focusing lens.

The second exposure time may be set to a range of ½ to ¹⁄₁₀ of the first exposure time.

The AF adjusting apparatus may further include an image compositing determiner that determines generation of the composite image signal if a brightness saturation area is detected from the first image signal.

The AF adjusting apparatus may further include: a reference parameter storage storing a reference brightness range and a reference ratio range; and an image compositing determiner counting a number of pixels included in the reference brightness range by using the brightness histogram and determining whether a ratio of the counted number of pixels to a total number of pixels is within the reference ratio range, wherein if the ratio is within the reference ratio range, the image compositing determiner may determine that a brightness saturation area is detected from the first image signal, and may determine generation of the second image signal.

If the image compositing determiner determines generation of the second image signal, the image composer may combine the first image signal and the second image signal.

The reference brightness range stored in the reference parameter storage may include one or more of a minimum brightness vale and a maximum brightness vale, and the reference ratio range stored in the reference parameter storage may include one or more of a minimum ratio value and a maximum ratio value.

The AF adjusting apparatus may further include: an imaging device receiving light passing through the imaging lens and generating an image signal; a shutter determining a time during which the imaging device is exposed to light; and an imaging device control driving the imaging device and the shutter to generate one or more of the first image signal, the second image signal, and the composite image signal at each position where the focusing lens is moved.

The image composer may generate the composite image signal by replacing a brightness saturation area of the first image signal with a corresponding area of the second image signal.

The image composer may combine the first image signal and the second image signal by using the following formula:

$$P3(x,y)=P1(x,y) \times w1 + P2(x,y) \times (1-w1),$$

where $P1(x, y)$ refers to a pixel brightness value at a coordinate $(x, y)$ of the first image signal, $P2(x, y)$ refers to a pixel brightness value at a coordinate $(x, y)$ of the second image signal, and $P3(x, y)$ refers to a pixel brightness value at a coordinate $(x, y)$ of the composite image signal.

The brightness weight value w1 may be reversely proportional to $P1(x, y)$.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXEMPLARY EMBODIMENTS

Reference will now be made in detail to exemplary embodiments, which are illustrated in reference to the accompanying drawings. In this regard, the inventive concept may have different forms and should not be construed as being limited to the exemplary embodiments set forth herein. Accordingly, the exemplary embodiments are merely described below, by referring to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations will be ruled out in order not to unnecessarily obscure object matters of the exemplary embodiments.

Hereinafter, the exemplary embodiments will be described in detail with reference to the accompanying drawings. In the drawings, like reference numerals denote like elements, and overlapping descriptions thereof will be omitted.

Figure 1:
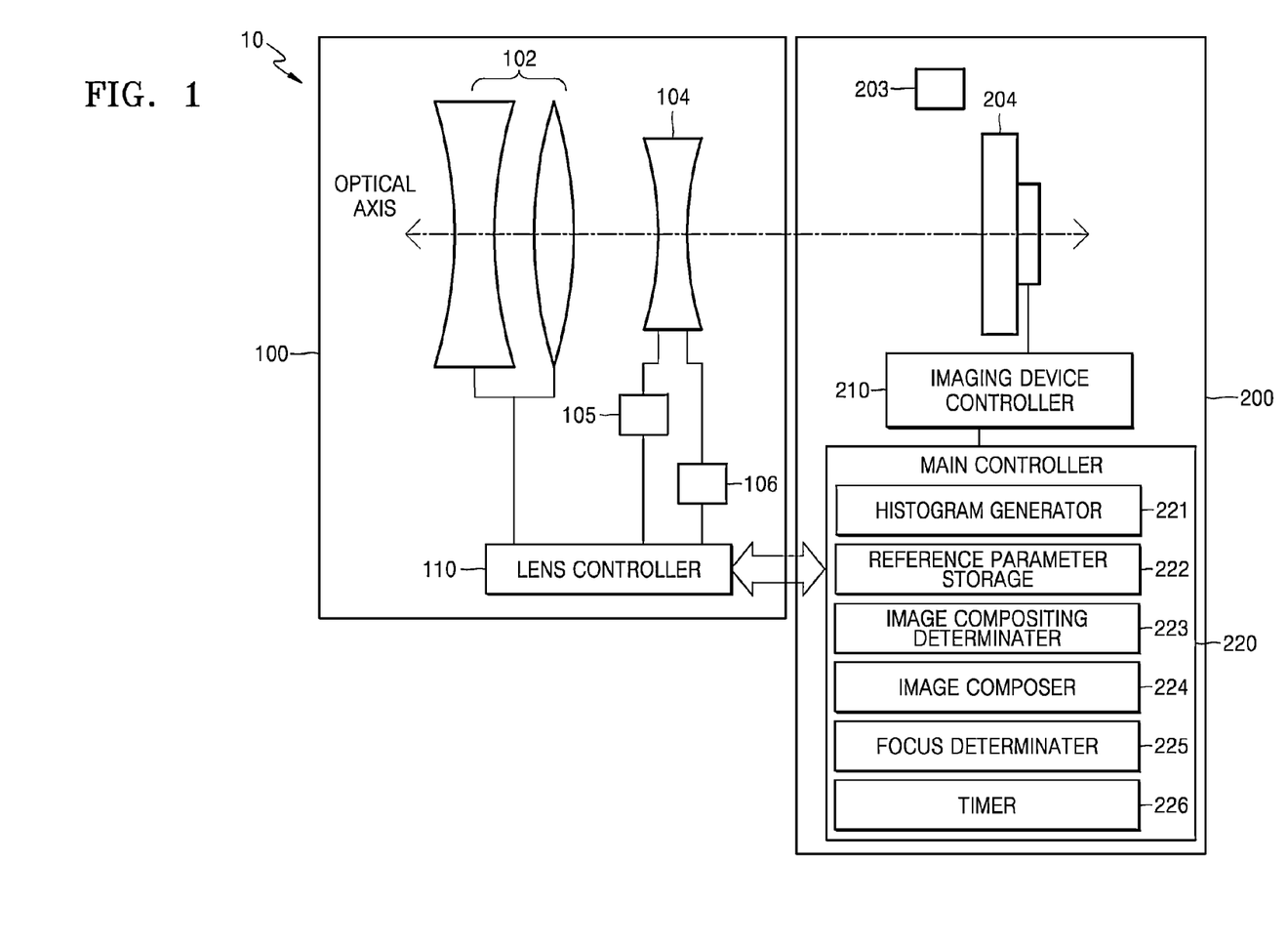
FIG. 1 is a block diagram schematically illustrating an autofocus (AF) adjusting apparatus, according to an exemplary embodiment.

FIG. 1 is a block diagram schematically illustrating an autofocus (AF) adjusting apparatus 10, according to an exemplary embodiment.

Referring to FIG. 1, the AF adjusting apparatus 10 of the present exemplary embodiment includes a lens unit 100 and a driving unit 200.

The lens unit 100 includes a zoom lens 102, a focusing lens 104, a focusing lens position sensor 106, a lens actuator 105, and a lens controller 110. In addition, although not shown, the lens unit 100 may further include various optical lenses, an aperture stop, and an aperture stop actuator.

The zoom lens 102 for zoom control and the focusing lens 104 for varying a focus point may be provided in the form of a lens group in which a plurality of lenses are combined. Hereinafter, the combination of the zoom lens 102 and the focusing lens 104 will be referred to as an imaging lens.

The focusing lens position sensor 106 detects a position of the focusing lens 104. A timing for sensing the position of the focusing lens 104 may be set by the lens controller 110 or a main controller 220 (to be described later). For example, the position of the focusing lens 104 may be detected when an AF detection process is performed on an image signal.

The lens actuator 105 drives the focusing lens 104 under the control of the lens controller 110. According to an exemplary embodiment, the lens actuator 105 may move the focusing lens 104 along an optical axis. That is, the lens actuator 105 may be an example of a focusing lens driving unit.

Detected information about the position of the focusing lens 104 is transmitted from the lens controller 110 to the main controller 220. According to an exemplary embodiment, if the position of the focusing lens 104 varies, or the main controller 220 requests information about the position of the focusing lens 104, the lens controller 110 may transmit detected information about the position of the focusing lens 104 to the main controller 220.

The driving unit 200 may include a shutter 203, an imaging device 204, an imaging device controller 210, and the main controller 220. The driving unit 200 drives the focusing lens 104 by controlling the lens unit 100.

The shutter 203 determines a time during which the imaging device 204 is exposed to light, that is, an exposure time. According to an exemplary embodiment, the shutter 203 may be a mechanical shutter including a mechanical front curtain and a mechanical rear curtain. However, the shutter 203 is not limited thereto. For example, the shutter 203 may be an electronic front curtain shutter which includes an electronic front curtain starting exposure by resetting an accumulated charge and a mechanical rear curtain. According to another exemplary embodiment, the shutter 203 may be a global shutter including an electronic front curtain starting exposure by resetting an accumulated charge and an electronic rear curtain stopping exposure by transferring an accumulated charge to a non-exposure part.

The imaging device 204 receives light passing through the imaging lens and generates an image signal. The imaging device 204 may include a plurality of photoelectric conversion units arranged in a matrix form, and vertical and/or horizontal transfer lines through which charges are transferred from the photoelectric conversion units for generating an image signal. A charge coupled device (CCD) sensor or a complementary metal oxide semiconductor (CMOS) sensor may be used as the imaging device 204.

The imaging device controller 210 generates a timing signal and controls image pickup operations of the imaging device 204 in synchronization with the timing signal. In addition, the imaging device controller 210 drives the shutter 203 according to a determined exposure time.

The main controller 220 includes a histogram generator 221, a reference parameter storage 222, an image compositing determiner 223, an image composer 224 composing image signals generated by the imaging device 204, a focus determiner 225, and a timer 226.

The histogram generator 221 generates a brightness histogram indicating the number of pixels with respect to a brightness level of an image signal. The histogram generator 221 receives a first image signal from the imaging device 204. Such an image signal may be a data set including pixel data according to coordinates, and the pixel data may be pixel brightness values.

The histogram generator 221 may divide a whole brightness range into a plurality of brightness levels, and may determine a brightness level of each pixel according to pixel brightness values of the first image signal. The histogram generator 221 may generate a brightness histogram using information about the number of pixels included in each brightness level. For example, if the whole brightness level ranges from 0 to 4095 and is divided into 64 brightness levels, the histogram generator 221 may include pixels having a brightness value of 0 to 63 in a first brightness level. After including all pixels in respective brightness levels in this manner, the histogram generator 221 may count the number of pixels of the first image signal included in each brightness level, and may make a brightness histogram from the counting results.

The reference parameter storage 222 stores a brightness parameter and a ratio parameter.

The brightness parameter may refer to a reference brightness range including one or more of a minimum brightness value and a maximum brightness value. Here, brightness values may mean brightness levels. For example, the reference parameter storage 222 may store a brightness parameter including a $50^{th}$ brightness level as a minimum brightness value and a $56^{th}$ brightness level as a maximum brightness value.

The ratio parameter may refer to a reference ratio range including one or more of a minimum ratio value and a maximum ratio value. Here, each ratio value refers to a ratio of the number of particular pixels to the number of all pixels. For example, the reference parameter storage 222 may store a ratio parameter including 0.15 as a minimum ratio value and 0.2 as a maximum ratio value.

Each of the brightness parameter and the ratio parameter may be changed by a user. However, the brightness parameter and the ratio parameter are not limited thereto.

The image compositing determiner 223 determines whether the AF adjusting apparatus 10 generates a composite image signal. The image compositing determiner 223 may determine whether to generate a composite image signal by comparing a brightness histogram of an image signal obtained by photographing with reference parameters. For example, the image compositing determiner 223 may analyze a brightness histogram of a first image signal to count the number of pixels having brightness values in a range from the 50th brightness level to the 56th brightness level. Then, if the counted number of pixels is 15% to 20% of the total number of pixels, the image compositing determiner 223 may determine that a brightness saturation area is detected in the first image signal and determine to generate a composite image signal.

The image composer 224 composes images for calculating focus detection evaluation values. If the image compositing determiner 223 determines to generate a composite image signal, the image composer 224 may compose images for calculating focus detection evaluation values. To this end, first, the image composer 224 receives a first image signal and a second image signal from the imaging device controller 210.

The first image signal is an image signal obtained when the shutter 203 is set to a first exposure time, and if an area (or object) of the first image signal includes a light source, the brightness value of pixels corresponding to the light source may be saturated.

The second image signal is an image signal obtained according to a second exposure time that is shorter than the first exposure time, and may be used to convert pixel data of the first image signal having a saturated brightness value.

The first exposure time may be a time during which the imaging device 204 is exposed when an area (or object) is normally photographed, and the second exposure time may be shorter than the first exposure time so as to reduce a saturated area of the second image signal.

According to an exemplary embodiment, the second exposure time may be a maximum possible time during which pixel brightness of the second image signal remains unsaturated. According to an exemplary embodiment, the second exposure time may be set to a range of ½ to ⅒ of the first exposure time.

According to an exemplary embodiment, the first exposure time may be set to be about 1/60 sec to about 1/30 sec, and the second exposure time may be set to be about 1/300 sec or shorter for the case of using a high-speed shutter.

The image composer 224 may generate a composite image signal while sequentially reading brightness values from the first and second image signals according to pixel coordinates. The composite image signal may be an image signal obtained by converting saturated pixel data of the first image signal by using data of the second image signal.

According to an exemplary embodiment, the composite image signal may be generated in the following manner. While reading pixel data of the first image signal according to coordinates, if a pixel brightness value at a certain coordinate is equal to or greater than a reference brightness value, pixel data of the second image signal corresponding to the certain coordinate is used instead of the pixel brightness value. In this case, the reference brightness value may be a saturated brightness value which is the maximum brightness value Ymax that pixels can have. However, the reference brightness value is not limited thereto. For example, the reference brightness value may be set to range from 0.8×Ymax to 0.9×Ymax.

According to another exemplary embodiment, the composite image signal may be generated by setting weights to the first and second image signals. For example, the composite image signal may be determined by the following formula:

$$P3(x,y)=P1(x,y)\times w1+P2(x,y)\times(1-w1),$$

where P1(x, y) refers to a pixel brightness value at a coordinate (x, y) of the first image signal, P2(x, y) refers to a pixel brightness value at a coordinate (x, y) of the second image signal, and P3(x, y) refers to a pixel brightness value at a coordinate (x, y) of the composite image signal.

In addition, w1(x, y) refers to a brightness weight value. w1(x, y) may be selected from a graph or data set by a user according to brightness. w1(x, y) may be varied within the range of 0 to 1 according to P1(x, y). According to an exemplary embodiment, w1(x, y) may be determined by the formula: w1(x, y)=−a×P1(x, y)/Ymax+1 (a>0). In the formula, Ymax refers to a maximum brightness value. According to an exemplary embodiment, if the output of the imaging device 204 is 12 bit, brightness values may range from 0 to 4095, and Ymax may be 4095. If the output of the imaging device 204 is 8 bit, Ymax may be 255. In addition to this, w1(x, y) may be set according to various weight setting methods.

The first image signal and the second image signal may be combined using other various methods. For example, the first and second image signals may be combined using a gradient base method.

The first image signal, the second image signal, and the composite image signal may be obtained at each position of the focusing lens 104 while moving the focusing lens 104.

The focus determiner 225 calculates contrast values by performing an AF detection process on the composite image signal generated by the image composer 224. In addition, the focus determiner 225 stores a contrast value at each AF detection time point according to a timing signal generated by the imaging device controller 210, and calculates a focus point by using lens position information transmitted from the lens unit 100 and stored contrast values. Results of the focus point calculation are transmitted to the lens unit 100.

The focus determiner 225 performs an AF process using the composite image signal obtained according to the position of the focusing lens 104. In this case, if a contrast AF method is used, the focus determiner 225 calculates a focus point from focus detection evaluation values (hereinafter referred as "AF evaluation values") related with contrast values, and then moves the lens unit 100 according to results of the calculation. The AF evaluation values may be contrast difference values between pixels of the composite image signal.

The focus determiner 225 calculates information necessary for controlling the focusing lens 104 by using the AF evaluation values and transmits the information to the lens controller 110. A process for determining the position of the focusing lens 104 using AF evaluation values will be described later in detail.

The timer 226 measures time. Timing for detecting the position of the focusing lens 104 may be set based on the time measured using the timer 226. In addition, the imaging device controller 210 may generate a timing signal based on the time measured using the timer 226.

The lens controller 110 performs an AF process by controlling the lens actuator 105 based on received information so as to move the focusing lens 104 along the optical axis. The position of the focusing lens 104 is monitored by the focusing lens position sensor 106 for feedback control.

If a user manipulates the zoom lens 102 for zooming, the lens controller 110 may vary AF control parameters for the focusing lens 104 and perform an AF process again.

FIGS. 2A to 2D are graphs illustrating a process for determining a position of the focusing lens 104 using AF evaluation values.

In a contrast AF method, an AF process is performed by repeatedly calculating AF evaluation values related with contrast values from image signals, and detecting a focus point of the focusing lens 104 at which a maximum AF evaluation value is obtained. In FIGS. 2A to 2D, the horizontal axis refers to the position of the focusing lens 104, and the vertical axis refers to AF evaluation values obtained from a composite image signal.

Figure 2A:
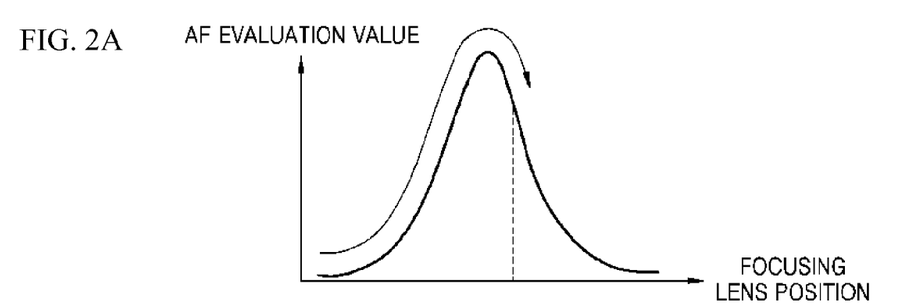
FIGS. 2A to 2D are graphs illustrating a process for determining a position of a focusing lens using AF evaluation values.

Referring to FIG. 2A, first, scanning is performed while driving the focusing lens 104 from one side to the other side to find a peak of AF evaluation values (hereinafter this will be referred as operation A). Here, the term "scanning" refers to calculation of AF evaluation values while moving the focusing lens 104. An approximate position of the peak is detected through operation A.

Figure 2B:
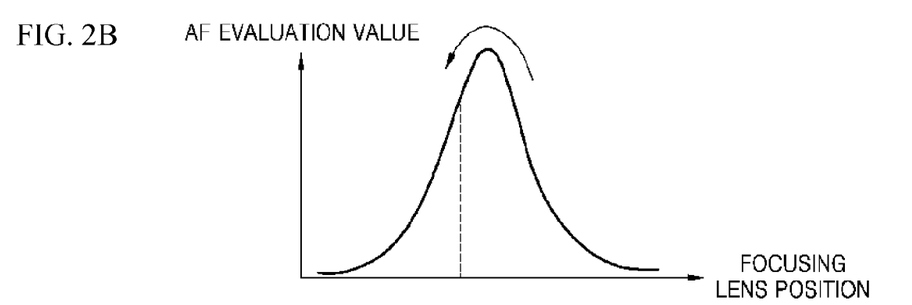

Next, as shown in the graph of FIG. 2B, the focusing lens 104 is driven in the opposite direction at a speed lower than the speed in operation A of FIG. 2A so as to detect the peak again (hereinafter this will be referred to as operation B). AF detection may be performed more accurately through operation B.

Figure 2C:
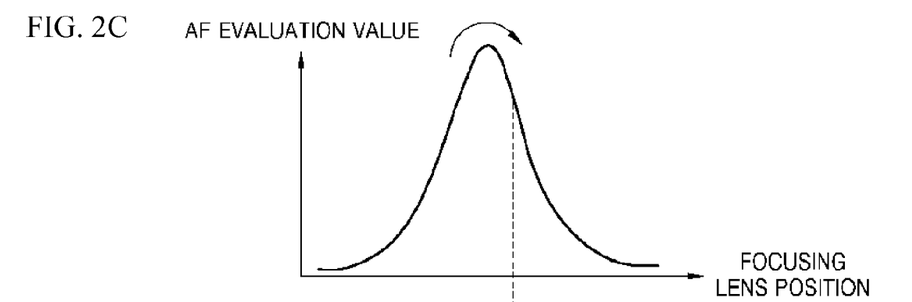

Next, as shown in the graph of FIG. 2C, the driving direction of the focusing lens 104 is reversed again to move the focusing lens 104 toward a focus point corresponding to the detected peak (hereinafter this will be referred to as operation C). At this time, since a backlash phenomenon generally occurs in a lens driving device, lens position errors are caused according to the driving direction. Therefore, such lens position errors have to be removed. The focusing lens 104 is moved to pass the focus point in operation C.

Figure 2D:
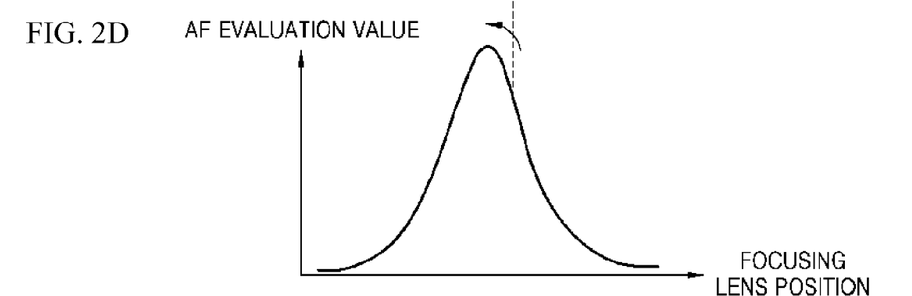

Finally, as shown in the graph of FIG. 2D, the moving direction of the focusing lens 104 is reversed again to move the focusing lens 104 in the same direction as the direction in the operation B, and the focusing lens 104 is stopped at the focus point (hereinafter this will be referred to as operation D).

An AF process is performed through operations A to D.

According to an exemplary embodiment, a first image signal and a second image signal are obtained by continuously varying the exposure time at each position of a single focusing lens, and a composite image signal is generated from the first and second image signals. Thereafter, AF evaluation values may be calculated from the composite image signal.

However, the above-described AF process and calculation of AF evaluation values are examples. That is, the inventive concept is not limited thereto.

For example, the AF adjusting apparatus 10 may obtain a first image signal at each position of the focusing lens 104 in a condition of a first exposure time and a second image signal at each position of the focusing lens 104 in a condition of a second exposure time so as to generate a composite image signal from the first and second image signals. Thereafter, AF evaluation values may be calculated from the composite image signal, and a peak of the AF evaluation values may be found by a mathematical method such as fitting to move the focusing lens 104 thereto. Other various modifications may be made therefrom.

As described above, according to the present exemplary embodiment, when AF evaluation values are calculated, the position of the focusing lens 104 may be exactly found using a composite image signal even though a light source is included in an area (or object) to be photographed.

Figure 3A:
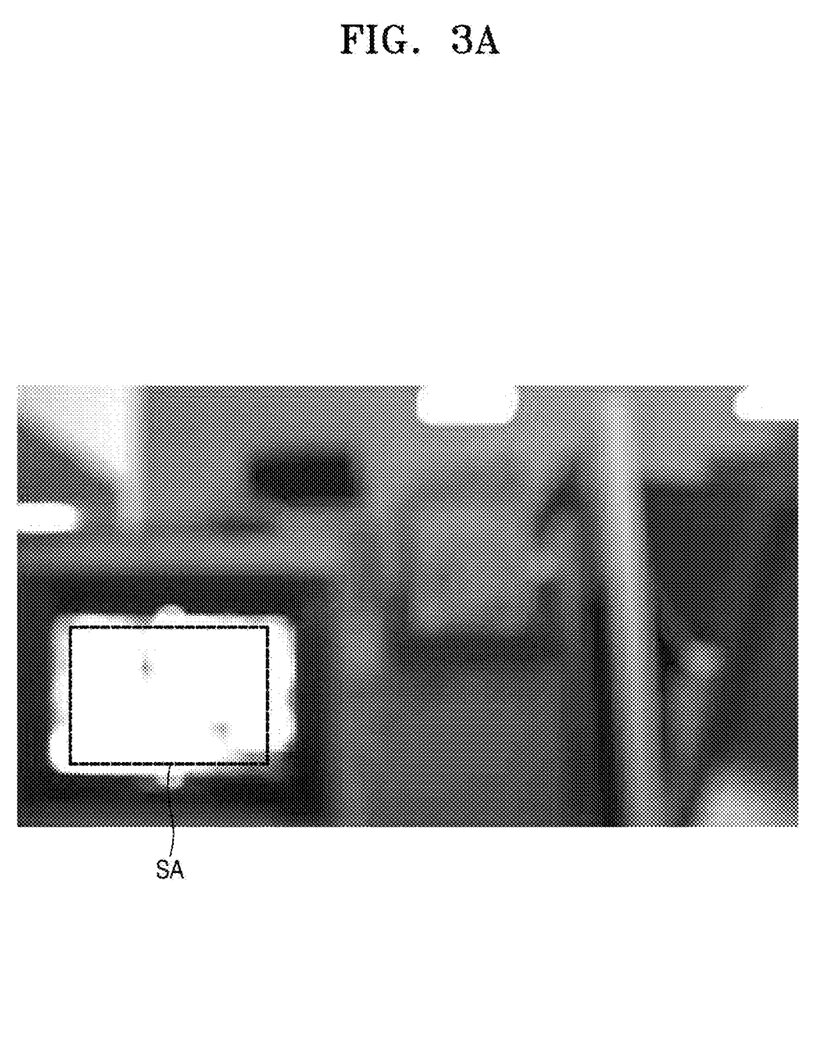
FIG. 3A is a view illustrating an image signal obtained from an area (or object) having a light source.
Figure 3B:
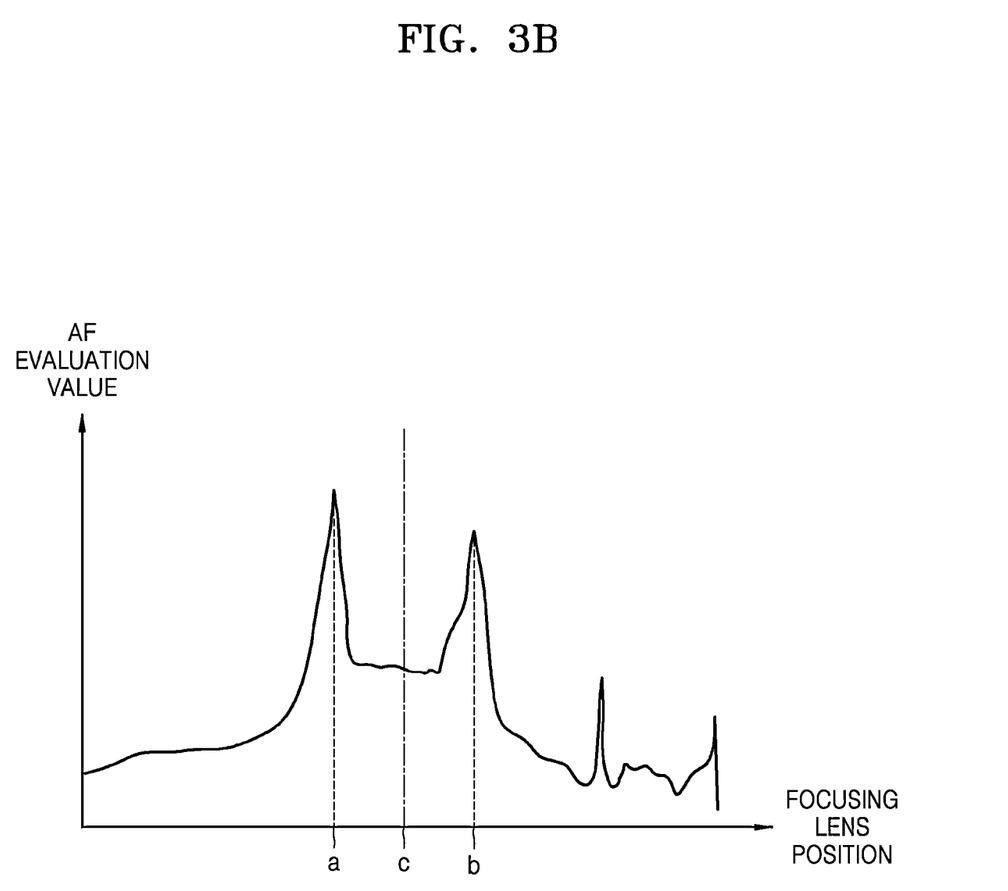
FIG. 3B is an AF evaluation value graph of the related art.

FIG. 3A is a view illustrating an image signal obtained from an area having a light source, and FIG. 3B is an AF evaluation value graph of the related art.

FIG. 3A illustrates an image signal having a saturated area SA due to, for example, a light source included in an area.

FIG. 3B illustrates a graph obtained using a related-art technique by calculating AF evaluation values with respect to an image shown in FIG. 3A according to the position of the focusing lens 104. Referring to FIG. 3B, a plurality of peaks are shown. That is, the graph includes a high AF evaluation value at a position different from a focus point due to the saturation area SA.

A position (a) may be an exact focus point of the focusing lens. A position (b) of the focusing lens 104 may be a position corresponding to the saturation area SA of the subject.

As described above, if the AF evaluation values have a plurality of peaks, a position which is not an exact focus point may be determined as a focus point of the focusing lens 104 in the above-described process for determining the position of the focusing lens 104. For example, a position (c) may be determined as the focus point of the focusing lens 104.

Figure 4A:
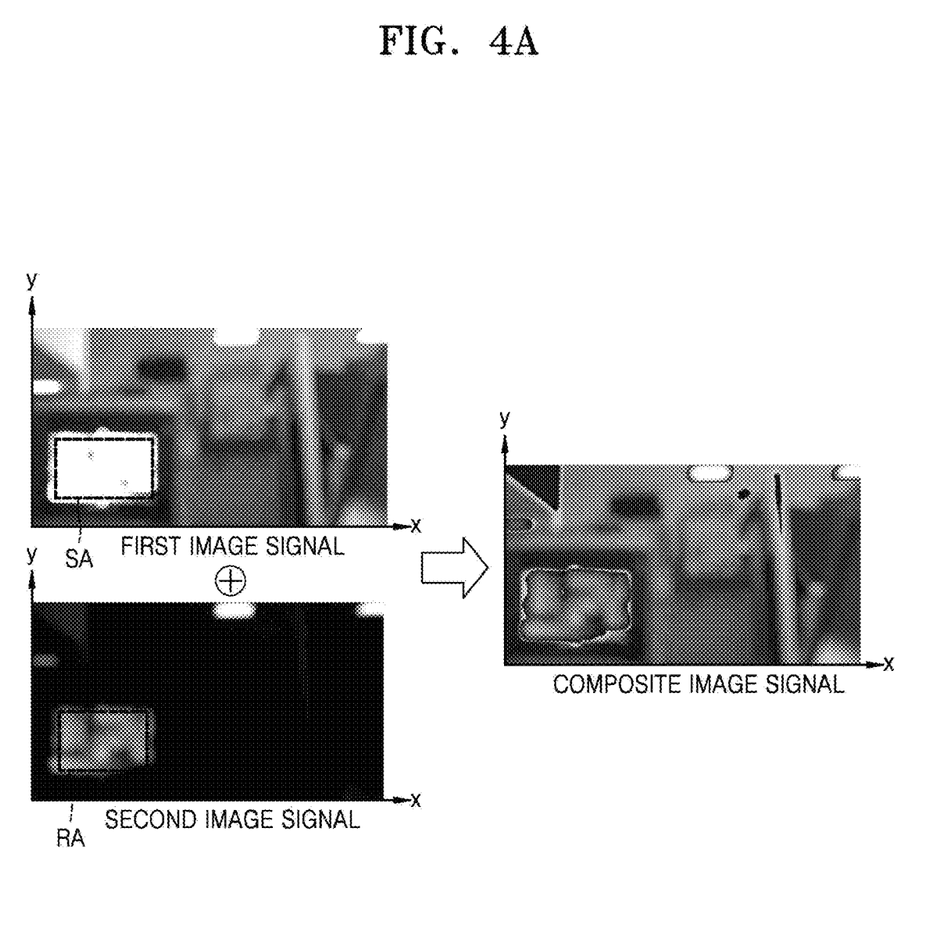
FIGS. 4A and 4B illustrate an image compositing method and an AF evaluation value graph according to an exemplary embodiment, for the case in which a light source is included in a subject.
Figure 4B:
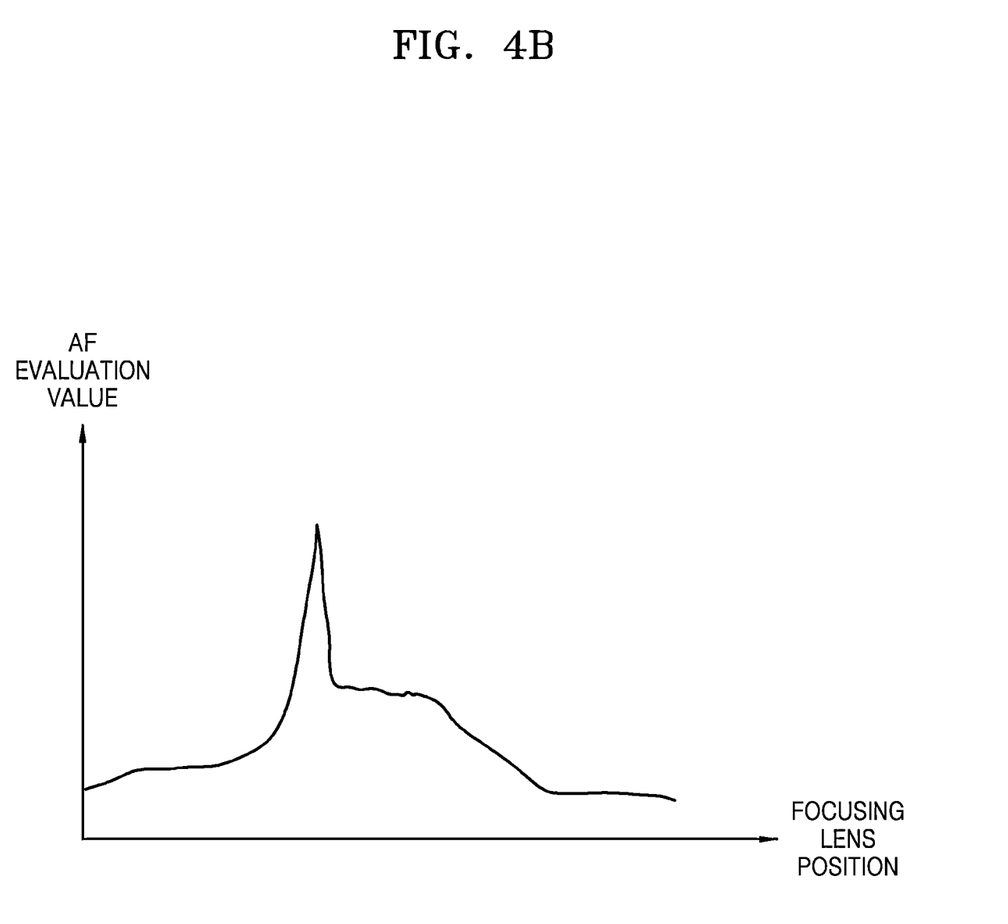

FIGS. 4A and 4B illustrate an image compositing method and an AF evaluation value graph according to an exemplary embodiment for the case in which a light source is included in an area to be photographed.

A first image signal is an image signal obtained by photographing in a condition of a general exposure time, that is, a first exposure time, and a second image signal is an image signal obtained in a condition of a shorter exposure time using a high-speed shutter.

The first image signal may include a saturated area SA in which brightness of pixels corresponding to the light source in the area (or object) is saturated.

The second image signal may be an image signal obtained in a condition of a second exposure time shorter than the first exposure time, and may be used to convert pixel data of the first image signal having a saturated brightness value. That is, the second image signal may be an image signal obtained using a high-speed shutter to derive a replacement area RA for replacing an area corresponding to the saturated area SA of the first image signal. The replacement area RA may be a non-saturated area. However, the replacement area RA is not limited thereto. For example, the replacement area RA may include saturated pixels. In this case, however, the replacement area RA may include fewer saturated pixels than the first image signal.

The first exposure time may be a time during which the imaging device 204 is exposed when an area (or object) is normally photographed, and the second exposure time may be a shorter than the first exposure time so as to reduce a saturated area of the second image signal.

According to an exemplary embodiment, the second exposure time may be a maximum possible time during which pixel brightness of the second image signal remains unsaturated. According to an exemplary embodiment, the second exposure time may be set to a range of ½ to 1/10 of the first exposure time.

According to an exemplary embodiment, the first exposure time may be set to be about 1/60 sec to about 1/30 sec, and the second exposure time may be set to be about 1/300 sec or shorter for the case of using a high-speed shutter.

A composite image signal is a signal obtained by combining the first image signal and the second image signal in such a manner that the saturated area SA in the first image signal is replaced with the replacement area RA in the second image signal.

According to an exemplary embodiment, the first and second image signals may be combined by replacing a brightness saturation area of the first image signal with a corresponding area of the second image signal.

According to another exemplary embodiments, the first and second image signal may be combined using the following formula:

$$P3(x,y)=P1(x,y) \times w1 + P2(x,y) \times (1-w1),$$

where P1(x, y) refers to a pixel brightness value at a coordinate (x, y) of the first image signal, P2(x, y) refers to a pixel brightness value at a coordinate (x, y) of the second image signal, and P3(x, y) refers to a pixel brightness value at a coordinate (x, y) of the composite image signal.

In addition, w1(x, y) refers to a brightness weight value. w1(x, y) may be selected from a graph or data set by a user according to brightness. w1(x, y) may be varied within the range of 0 to 1 according to P1(x, y). According to an exemplary embodiment, w1(x, y) may be determined by the formula: w1(x, y)=−a×P1(x, y)/Ymax+1 (a>0). In the formula, Ymax refers to a maximum brightness value. According to an exemplary embodiment, if the output of the imaging device 204 is 12 bit, brightness values may range from 0 to 4095, and Ymax may be 4095. If the output of the imaging device 204 is 8 bit, Ymax may be 255. In addition to this, w1(x, y) may be set according to various weight setting methods.

The first image signal and the second image signal may be combined by various other methods. For example, the first and second image signals may be combined by a gradient base method.

FIG. 4B illustrates an AF evaluation value graph obtained from the composite image signal. Referring to FIG. 4B, there is only one AF evaluation value peak with respect to a focusing lens position. In the composite image signal, the saturated area SA caused by, for example, the light source is replaced. Therefore, an AF evaluation value peak corresponding to the saturated area SA is not present. In the graph of FIG. 4B, the peak is present at an exact focus point. That is, an exact focus point may be obtained in a process for determining the position of the focusing lens 104.

Figure 5:
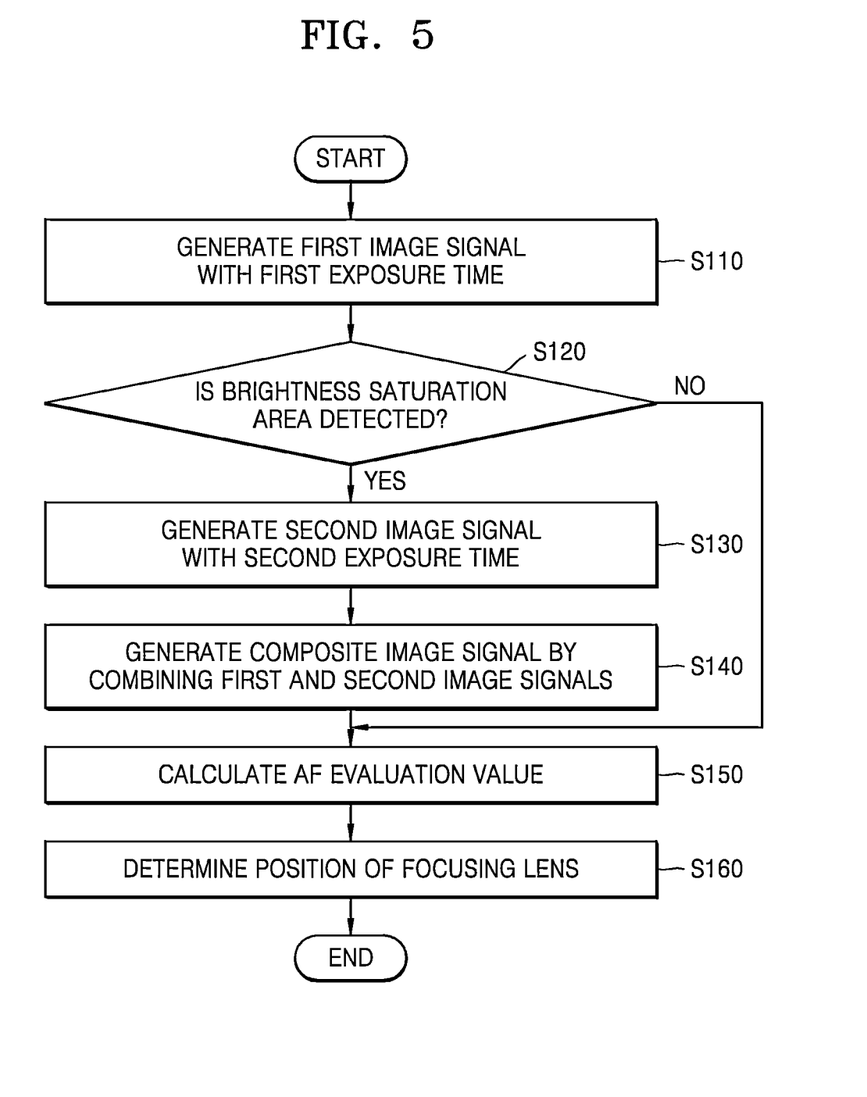
FIG. 5 is a flowchart illustrating an AF adjusting method according to an exemplary embodiment.

FIG. 5 is a flowchart illustrating an AF adjusting method according to an exemplary embodiment.

The AF adjusting method of the present exemplary embodiment includes: generating a first image signal by receiving light from (or capturing an image of) an area (or object) during a first exposure time (operation S110); determining whether a brightness saturation area is detected from the first image signal (operation S120); generating a second image signal by receiving light from (or capturing an image of) the area (or object) during a second exposure time (operation S130); generating a composite image signal by combining the first image signal and the second image signal (operation S140); and calculating an AF evaluation value from an image signal (operation 150).

Operations S130 and S140 may be performed if a brightness saturation area is detected from the first image signal in operation S120. If a brightness saturation area is not detected from the first image signal in operation S120, an AF evaluation value may be calculated from the first image signal in operation S150.

Operations S110 to S150 may be performed each time the position of the focusing lens 104 (refer to FIG. 1) is changed. In this manner, AF evaluation values may be obtained according to the position of the focusing lens 104, and the position of the focusing lens 104 may be determined based on an AF evaluation value peak (operation S160).

The first exposure time may be a time during which the imaging device 204 is exposed when an area (or object) is normally photographed, and the second exposure time may be a shorter than the first exposure time so as to reduce a saturated area of the second image signal.

According to an exemplary embodiment, the second exposure time may be the maximum time of a time range in which pixel brightness of the second image signal is not saturated. In other exemplary embodiments, the second exposure time may be set to a range of ½ to 1/10 of the first exposure time.

According to an exemplary embodiment, the first exposure time may be set to be about 1/60 sec to about 1/30 sec, and the second exposure time may be set to be about 1/300 sec or shorter for the case of using a high-speed shutter.

The composite image signal may be generated by combining the first and second image signals using various methods.

According to an exemplary embodiment, the first and second image signals may be combined by replacing a brightness saturation area of the first image signal with a corresponding area of the second image signal.

According to another exemplary embodiment, the first and second image signals may be combined using the following formula:

$$P3(x,y)=P1(x,y)\times w1+P2(x,y)\times(1-w1),$$

where P1(x, y) refers to a pixel brightness value at a coordinate (x, y) of the first image signal, P2(x, y) refers to a pixel brightness value at a coordinate (x, y) of the second image signal, and P3(x, y) refers to a pixel brightness value at a coordinate (x, y) of the composite image signal.

In addition, w1(x, y) refers to a brightness weight value. w1(x, y) may be selected from a graph or data set by a user according to brightness. w1(x, y) may be varied within the range of 0 to 1 according to P1(x, y). According to an exemplary embodiment, w1(x, y) may be determined by the formula: w1(x, y)=−a×P1(x, y)/Ymax+1 (a>0). In the formula, Ymax refers to a maximum brightness value. According to an exemplary embodiment, if the output of the imaging device 204 is 12 bit, brightness values may range from 0 to 4095, and Ymax may be 4095. If the output of the imaging device 204 is 8 bit, Ymax may be 255. In addition to this, w1(x, y) may be set according to various weight setting methods.

The first image signal and the second image signal may be combined by various other methods. For example, the first and second image signals may be combined by a gradient base method.

Figure 6:
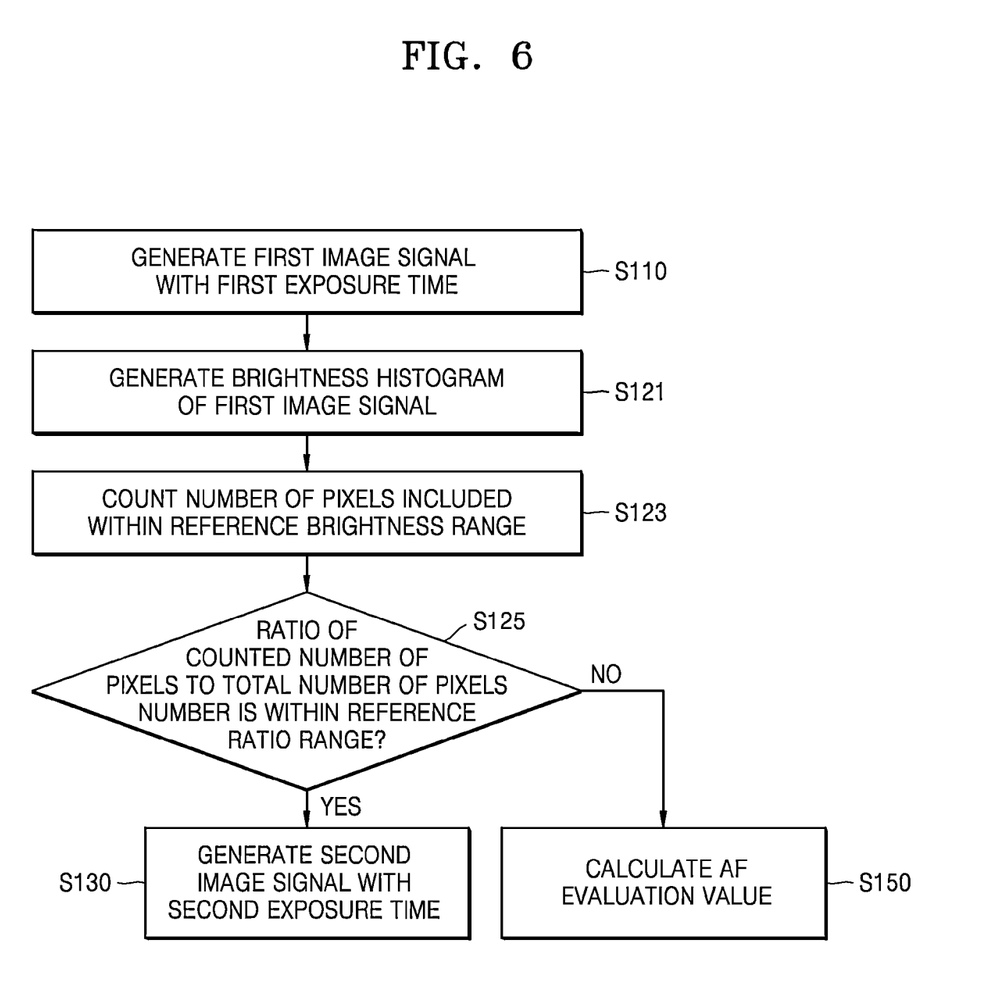
FIG. 6 is a flowchart illustrating how a brightness saturation area is detected according to an exemplary embodiment.

FIG. 6 is a flowchart illustrating how a brightness saturation area is detected in reference to FIG. 1, according to an exemplary embodiment.

Referring to FIG. 6, if the imaging device 204 generates a first image signal in a condition of a first exposure time (operation S110), the histogram generator 221 generates a brightness histogram of the first image signal (S121).

The image compositing determiner 223 compares the brightness histogram of the first image signal with a reference brightness range stored in the reference parameter storage 222 to count the number of pixels included in the reference brightness range (operation S123).

The image compositing determiner 223 compares the ratio of the counted number of pixels to the total number of pixels with a reference ratio range stored in the reference parameter storage 222, and if the ratio is within the reference ratio range, the image compositing determiner 223 determines to generate a second image signal in a condition of a second exposure time (operation S130).

If the ratio is not within the reference ratio range, a second image signal is not generated, and an AF evaluation value is calculated from the first image signal (operation S150).

According to the AF adjusting apparatus and method of the above exemplary embodiments, the method of detecting a focus point is changed by using a brightness histogram according to the size of an area in which pixels are brighter than a reference brightness value, and thus AF adjustment may be performed more effectively.

In addition, AF detection may be performed using a composite image signal for obtaining more reliable results.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An autofocus (AF) adjusting method for an AF adjusting apparatus, the AF adjusting method comprising:
    generating a first image signal by photographing an area during a first exposure time;
    detecting a brightness saturation area included in the photographed area from the first image signal; and
    if the brightness saturation area is not detected from the first image signal, calculating a focus detection evaluation value from the first image signal, and
    if the brightness saturation area is detected from the first image signal, generating a second image signal by photographing the area during a second exposure time which is shorter than the first exposure time,
    generating a composite image signal by combining the first and second image signals, and
    calculating a focus detection evaluation value from the composite image signal.

2. The AF adjusting method of claim 1, wherein the second exposure time is a maximum possible time during which pixel brightness of the second image signal remains unsaturated.

3. The AF adjusting method of claim 1, wherein the second exposure time is set to a range of ½ to 1/10 of the first exposure time.

4. The AF adjusting method of claim 1, wherein the detecting the brightness saturation area included in the photographed area from the first image signal comprises:
    counting a number of pixels included in a reference brightness range; and
    determining whether a ratio of the counted number of pixels to a total number of pixels is within a reference ratio range,
    wherein if the ratio is not within the reference ratio range, the focus detection evaluation value is calculated from the first image signal, and if the ratio is within the reference ratio range, the second image signal is generated.

5. The AF adjusting method of claim 4, wherein the reference brightness range comprises one or more of a minimum brightness value and a maximum brightness value, and
wherein the reference ratio range comprises one or more of a minimum ratio value and a maximum ratio value.

6. The AF adjusting method of claim 1, wherein the AF adjusting apparatus comprises a movable focusing lens, and
wherein one or more of the first image signal, the second image signal, and the composite image signal are generated at each position where the focusing lens is moved.

7. The AF adjusting method of claim 1, wherein the generating the composite image signal is performed by replacing a brightness saturation area of the first image signal with a corresponding area of the second image signal.

8. The AF adjusting method of claim 1, wherein the first image signal and the second image signal are combined by using the following formula:

$$P3(x,y)=P1(x,y)\times w1+P2(x,y)\times(1-w1),$$

where P1(x, y) refers to a pixel brightness value at a coordinate (x, y) of the first image signal, P2(x, y) refers to a pixel brightness value at a coordinate (x, y) of the second image signal, and P3(x, y) refers to a pixel brightness value at a coordinate (x, y) of the composite image signal.

9. The AF adjusting method of claim 8, wherein the brightness weight value w1 ranges from 0 to 1 and is determined by the following formula:

$$1-a\times(P1(x,y)/Y\text{max}),$$

where a refers to a positive number, and Ymax refers to a maximum brightness value.

10. An AF adjusting apparatus comprising:
an imaging lens comprising a movable focusing lens for focus control;
an image compositing determiner configured to determine generation of a composite image signal if a brightness saturation area is detected from a first image signal obtained by photographing an area during a first exposure time;
an image composer configured to generate the composite image signal by combining the first image signal and a second image signal obtained by photographing the area during a second exposure time shorter than the first exposure time; and
a focus determiner configured to calculate a focus detection evaluation value based on a composite image signal generated by the image composer and determine a position of the focusing lens.

11. The AF adjusting apparatus of claim 10, wherein the second exposure time is set to a range of ½ to 1/10 of the first exposure time.

12. The AF adjusting apparatus of claim 10, further comprising:
a reference parameter storage configured to store a reference brightness range and a reference ratio range; and
an image compositing determiner configured to count a number of pixels included in the reference brightness range and determine whether a ratio of the counted number of pixels to a total number of pixels is within the reference ratio range,
wherein if the ratio is within the reference ratio range, the image compositing determiner is configured to determine that a brightness saturation area is detected from the first image signal, and determine generation of the second image signal.

13. The AF adjusting apparatus of claim 12, wherein if the image compositing determiner determines generation of the second image signal, the image composer is configured to combine the first image signal and the second image signal.

14. The AF adjusting apparatus of claim 12, wherein the reference brightness range stored in the reference parameter storage comprises one or more of a minimum brightness value and a maximum brightness value, and
wherein the reference ratio range stored in the reference parameter storage comprises one or more of a minimum ratio value and a maximum ratio value.

15. The AF adjusting apparatus of claim 10, further comprising:
an imaging device configured to receive light passing through the imaging lens and generate an image signal;
a shutter configured to determine a time during which the imaging device is exposed to the light; and
an imaging device controller configured to drive the imaging device and the shutter to generate one or more of the first image signal, the second image signal, and the composite image signal at each position where the focusing lens is moved.

16. The AF adjusting apparatus of claim 10, wherein the image composer is configured to generate the composite image signal by replacing a brightness saturation area of the first image signal with a corresponding area of the second image signal.

17. The AF adjusting apparatus of claim 10, wherein the image composer is configured to combine the first image signal and the second image signal by using the following formula:

$$P3(x,y)=P1(x,y)\times w1+P2(x,y)\times(1-w1),$$

where P1(x, y) refers to a pixel brightness value at a coordinate (x, y) of the first image signal, P2(x, y) refers to a pixel brightness value at a coordinate (x, y) of the second image signal, and P3(x, y) refers to a pixel brightness value at a coordinate (x, y) of the composite image signal.

18. The AF adjusting apparatus of claim 17, wherein the brightness weight value w1 is inversely proportional to P1(x, y).

* * * * *